United States Patent [19]

Rasmussen et al.

[11] 4,310,036
[45] Jan. 12, 1982

[54] TUNNEL CLEAN OUT MECHANISM FOR AN AGRICULTURAL BAG LOADING APPARATUS

[75] Inventors: David H. Rasmussen, Arlington, Nebr.; Richard H. Lee, Astoria, Oreg.

[73] Assignee: AG-BAG Corporation, Arlington, Nebr.

[21] Appl. No.: 113,558

[22] Filed: Jan. 21, 1980

[51] Int. Cl.³ .............................................. B65B 1/10
[52] U.S. Cl. ..................................... 141/114; 141/257; 141/313; 141/231; 141/89; 56/341; 56/344; 100/112; 100/189; 222/148
[58] Field of Search ................ 134/141; 100/112, 189, 100/188; 414/132; 141/10, 12, 67–80, 100, 114, 256, 257, 311 R–318, 377, 231–233, 391, 392, 89, 125; 56/344, 341; 222/148

[56] References Cited

U.S. PATENT DOCUMENTS

| | | |
|---|---|---|
| 3,222,853 | 12/1965 | Michael ........................... 100/188 R |
| 3,534,537 | 10/1970 | Buchele et al. ...................... 56/341 |
| 3,550,775 | 12/1970 | Cooley ................................... 100/112 |
| 3,871,291 | 3/1975 | Lassiter ................................. 100/112 |
| 3,968,633 | 7/1976 | Gaeddert et al. ...................... 56/341 |
| 4,046,068 | 9/1977 | Eggenmüller et al. ............. 100/189 |
| 4,157,643 | 6/1979 | White ................................... 100/189 |

FOREIGN PATENT DOCUMENTS 1021197 11/1977 Canada ................................... 56/341

Primary Examiner—Houston S. Bell, Jr.
Attorney, Agent, or Firm—Richards, Harris & Medlock

[57] ABSTRACT

In an agricultural bag loading apparatus (10) having an output chamber tunnel (32), the improvement comprising a tunnel cleanout mechanism. The tunnel cleanout plate (82) is pivotally mounted on the output chamber tunnel (32) and is pivoted from a retracted position to an extended position by means of dual hydraulic cylinders (88). Compressed silage and material entrapped within the tunnel (32) is extracted by pivotal movement of the tunnel cleanout plate (82) from the retracted position, where the plate (82) does not interfere with the loading operation, to the extended position.

11 Claims, 3 Drawing Figures

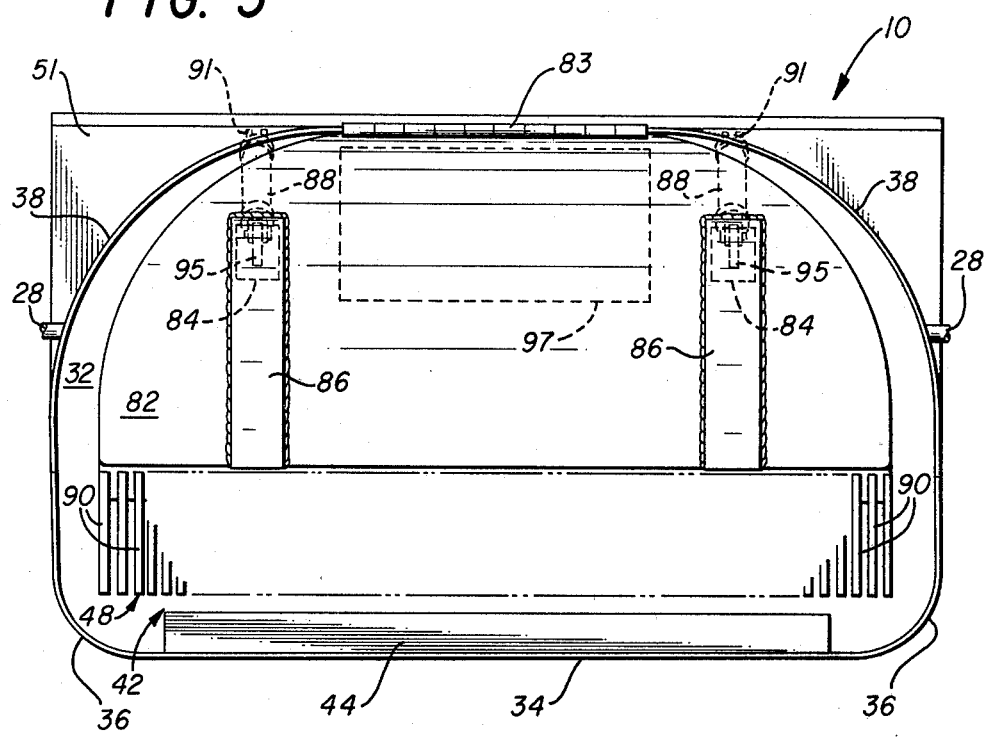

TUNNEL CLEAN OUT MECHANISM FOR AN AGRICULTURAL BAG LOADING APPARATUS

TECHNICAL FIELD

This invention relates to a mechanism for cleaning the tunnel of an agricultural bag loading apparatus for loading silage and the like into agricultural bags.

BACKGROUND ART

It is known to store agricultural products such as silage and the like in the field in large plastic bags referred to as agricultural bags. Such bags are generally designed to be filled from one end and may have a diameter in excess of ten feet and a length of up to 100 feet or more.

Machines have been developed to load silage and other agricultural products into such agricultural bags. A known conventional agricultural bag loading apparatus includes a housing with a rotating shaft mounted therein. The shaft has a plurality of teeth extending outwardly therefrom which are arranged in a generally even, albeit random pattern over the surface of the shaft. As the shaft rotates, the teeth force silage into an agricultural bag which has been secured adjacent to the loading apparatus. As silage is loaded into the bag, the loading apparatus moves away from the filled end of the bag in a controlled manner.

The known loading apparatus includes an output chamber or tunnel of relatively substantial volume. This tunnel is necessary in order to insure uniform distribution of the silage when loaded into the bag. It also forms a structure on which to store the unfilled bag portion and permit uniform and trouble free deployment of the bag when loading.

Although the known agricultural bag loading apparatus having such a tunnel has performed adequately, difficulties have been encountered in the operation of such apparatus. After filling and sealing one of the agricultural bags, this tunnel is still completely filled with compressed silage. This trapped silage can often be of substantial quantity, at times exceeding three tons.

In addition, the trapped material may fall out the end of the tunnel at an undesirable point in time. For instance, it could fall out during transportation on a public highway.

SUMMARY OF THE INVENTION

The foregoing and other problems associated with conventional agricultural bag loading machines are solved by means of the present invention in which an agricultural bag loading apparatus for loading silage and the like into agricultural bags is equipped with a tunnel clean out mechanism adapted to remove substantially all trapped silage within the tunnel of the loading machine.

In accordance with the present invention, a tunnel cleanout plate is pivotally mounted on the rearmost edge of the top wall of the tunnel. The cleanout plate is shaped to conform to the inner surface of the top wall and back wall of the tunnel and abuts these walls when in the retracted position.

Twin hydraulic cylinders, having telescoping piston rods, are pivotally mounted on the backing plate of the intake chamber. The piston rods extend through elongated slots in the back wall of the tunnel and are pivotally mounted at their ends on the surface of the tunnel cleanout plate adjoining the back wall.

Pressurization of the fluid within these hydraulic cylinders operates to extend the telescoping piston rods and force the tunnel cleanout plate to pivot rearwardly about its point of attachment to the top wall. The pivotal movement of the cleanout plate forces any entrapped silage within the tunnel to be pushed from the tunnel for disposition as desired.

BRIEF DESCRIPTION OF THE DRAWINGS

A more complete understanding of the invention may be had by reference to the following Detailed Description when taken in conjunction with the accompanying Drawings, wherein:

FIG. 3 is a vertical section view of a portion of the loading apparatus taken along line 3—3 of FIG. 2 in the direction of the arrows.

DETAILED DESCRIPTION

Figure 1:
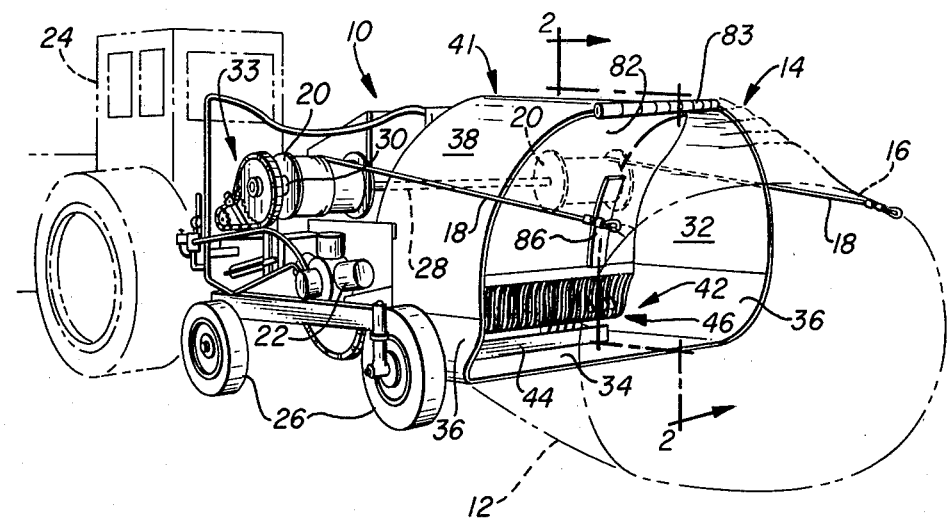
FIG. 1 is a perspective view of the agricultural bag loading apparatus of the present invention showing the tunnel clean out plate in the retracted position.

Referring now to the Drawings in which like reference characters designate like or corresponding parts throughout the several views, there is shown in FIG. 1 a perspective view of the agricultural bag loading apparatus 10 embodying the present invention. An agricultural bag 12, shown in phantom lines, is mounted on the loading apparatus 10 and partially filled with silage. The agricultural bag 12 is gathered near the bag mouth 14 in an accordion like fashion. As silage is fed into the agricultural bag 12, the loading apparatus 10 moves away from the filled end of the bag and the gathered portion of the bag expands to allow the bag to be filled.

A backstop 16, also shown in phantom lines, is positioned at the filled end of the agricultural bag 12. The backstop 16 is made of a suitable flexible material such as netting and conforms to the shape of the end of the agricultural bag 12. A pair of cables 18 extends between the backstop 16 and a pair of rotatable drums 20. The rotation of the drums 20 is resisted by a brake mechanism 33. A shaft 28 interconnects the two drums 20 so that they must rotate in unison. The shaft 28 is rotatably supported on loading apparatus 10 by bearings 30. As silage is forced into the agricultural bag 12, tension is created in cables 18 as the loading apparatus attempts to move away from the filled end of the bag. The motion of the loading apparatus away from the filled end of the bag is yieldably resisted by the brake force on drums 20 induced by brake mechanism 33. The tension on the cables 18 is applied uniformly and evenly against the filled end of the agricultural bag 12 by the backstop 16. In this manner, the silage within the agricultural bag 12 is compressed at a pressure corresponding to the brake force on the drums 20.

The prime mover of the loading apparatus 10 is a hydraulic motor 22. The hydraulic motor 22 receives its power from a hydraulic pump driven by a tractor 24 which is shown in phantom lines. The loading apparatus 10 is mounted on four wheels 26 that may rotate through an angle of 90°. Thus, the loading apparatus 10 may be moved laterally for transport as well as forwardly and rearwardly for positioning and use.

Conventional means are used to secure the loading apparatus 10 to the tractor 24 for towing the loading paratus 10 from place to place. As the agricultural bag 12 is filled with silage, the loading apparatus 10 is inched forward so that the bottom of the bag 12 remains stationary with respect to the ground. In some applications, it may be preferred to allow the loading apparatus 10 to remain stationary with respect to the ground while silage is loaded into the agricultural bag 12. In this latter case, the bottom of the agricultural bag 12 will be forced to slide along the ground or other support surface as it is filled.

The agricultural bag 12 and backstop 16 are shown in phantom lines in FIG. 1 so that the output chamber tunnel 32 may be seen. The lower portion of output chamber tunnel 32 is defined by a horizontal bottom 34 with two sidewalls 36 extending substantially vertically upward therefrom. The upper portion of the output chamber tunnel 32 is defined by two inclined sidewall sections 38, a backwall 40 and a topwall 41. Backwall 40 cannot be seen in FIG. 1 as tunnel cleanout plate 82 is shown in the retracted position abutting the inner surface of backwall 40 and topwall 41. Sidewall sections 38 and sidewalls 36 are joined to form an outward bulge in tunnel 32 to conform to the cross section of agricultural bag 12. Backwall 40 is joined to the inclined sidewall sections 38 and topwall 41, and is inclined rearwardly from its base to its apex.

Silage is forced into the output chamber tunnel 32 through a passageway 42. An inclined shield 44 is mounted on the bottom surface 34 in the center of the passageway 42. Gaps are left on either side of the shield 44 and the sidewalls 36 so that silage is more easily forced through the passageway 42 along the sides of the output chamber tunnel 32 than in the center of the tunnel 32. Silage is forced into the output chamber tunnel 32 by a plurality of teeth 46. As the teeth 46 pass out of the output chamber tunnel 32, a comb 48 strips silage from the teeth 46, retaining the silage in the output chamber tunnel 32.

Figure 2:
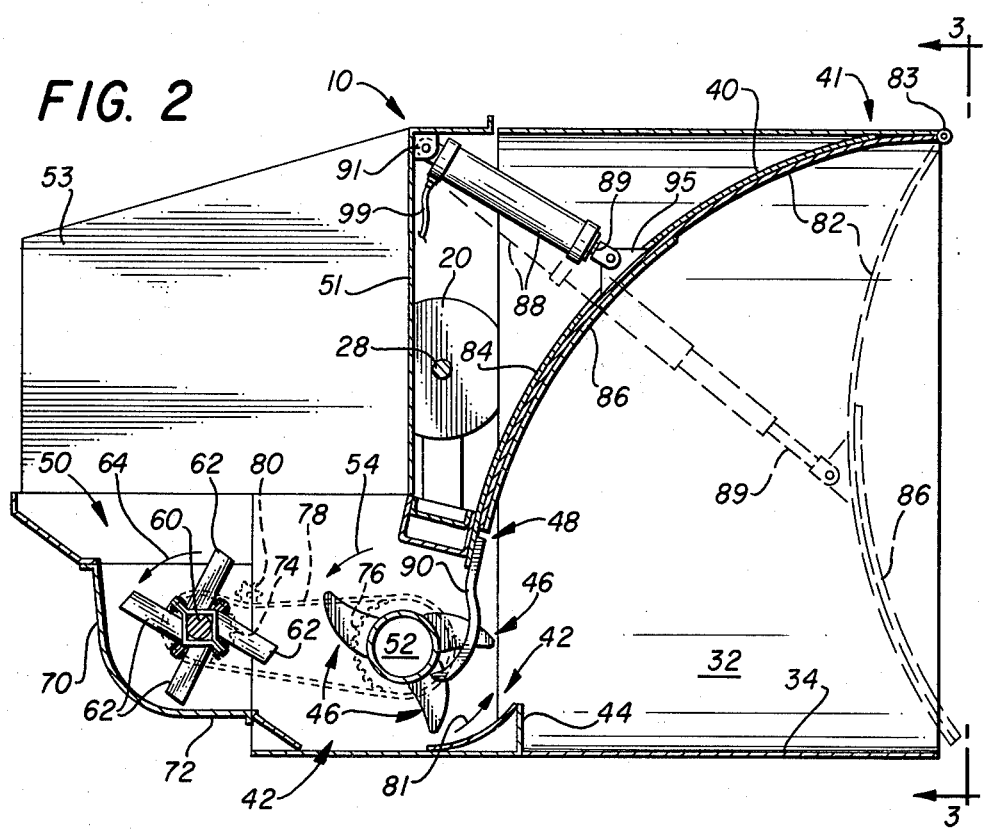
FIG. 2 is a vertical section view taken along line 2—2 of FIG. 1 in the direction of the arrows.

Referring now to FIG. 2, there is shown a vertical section view of loading apparatus 10 taken along line 2—2 and in the direction of the arrows shown in FIG. 1. This section is offset from the central axis of the loading apparatus 10 to clearly reveal one of the two telescoping hydraulic cylinders 88 employed in the present invention. The intake chamber 50 has an open top and one open side. Silage is fed into the forward portion of intake chamber 50 from the top. Intake backing plate 51 and guides 53 along the sides of intake chamber 50 aid the feeding of silage into the chamber. Feeder shaft 60 is rotatably mounted in the intake chamber 50. A plurality of feeder projections 62, which may comprise lengths of angle iron, are mounted on shaft 60 and extend outwardly therefrom in a substantially perpendicular relationship to the shaft 60. As the shaft 60 is rotated in the direction indicated by the arrow 64, silage is forced downwardly along the rearwall 70, under the shaft 60 along the bottom wall 72 and towards the primary shaft 52. In this manner, the feeder shaft 60 and the feeder projection 62 function to precompress the silage to a slight degree and insures that an adequate supply of silage is always presented to the teeth 46 mounted on primary shaft 52. Thus, the feeder insures the efficient operation of the loading apparatus 10 so long as an adequate amount of silage is fed into the input chamber 50.

The passageway 42 extends between and connects the intake chamber 50 and the output chamber tunnel 32. Primary shaft 52 is rotatably mounted on the loading apparatus 10 and may be considered to be within the intake chamber 50. The primary shaft 52 is rotated by motor 22 in the direction indicated by arrow 54 in FIG. 2 so that the teeth 46 force silage from the intake chamber 50 under the primary shaft 52 through the passageway 42, up the curved incline of shield 44 as indicated by arrow 81 in FIG. 2, and into the output chamber tunnel 32. As the teeth 46 return back into the intake chamber 50, the comb 48 strips the silage from the teeth 46. Teeth 46 are arranged in a generally even, albeit random pattern over the surface of shaft 52. The vertical section view in FIG. 2 contains only a short segment of shaft 52 and therefore reveals only a small percentage of the total number of teeth 46.

Sprockets 74 and 76 are mounted on the secondary shaft 60 and the primary shaft 52, respectively, and a chain 78 extends between the two sprockets so that the shaft 60 is rotated in response to the rotation of the shaft 52. The relative rotational velocities of the shaft 52 and 60 are controlled by the size of the sprockets 74 and 76. In the embodiment shown, sprocket 76 is slightly larger than sprocket 74 so that the shaft 60 will rotate at a greater rotational velocity than shaft 52. A tensioning sprocket 80 is used to control the tension in the chain 78.

Comb 48 includes a plurality of prongs 90 that extend downwardly in the output chamber 32 to a predetermined position adjacent the shaft 52. The teeth 46 and the prongs 90 are alternately arranged so that each tooth 46 passes between a pair of prongs 90, and so that each prong is positioned between a pair of teeth. Each prong 90 is curved with a convex surface of the prong facing the output chamber tunnel 32.

It will be appreciated that the teeth 46 have a curved leading edge which is swept back away from the direction of the travel of the teeth. This curvature enhances the ability of the comb 48 to strip silage from the teeth. Also, the curvature of the prongs 90 further enhance the ability of the comb 48 to strip silage from the teeth 46.

As primary shaft 52 rotates, it forces silage into the output chamber tunnel 32 and into the agricultural bag 12 secured thereto. Motion of the filled end of the agricultural bag 12 is resisted by the brake mechanism 33 acting on the drums 20. Drums 20 play out the cables 18 connected to the backstop 16. The rotation of primary shaft 32, in combination with the resistance to motion of the filled end of the agricultural bag 12 with respect to the loading apparatus 10, causes the silage in the bag 12 and output chamber tunnel 32 to be tightly compressed.

During the filling operation of an agricultural bag 12, the tunnel cleanout plate 82 is maintained in its retracted position, abutting the topwall 41 and backwall 40 of the output chamber tunnel 32. The plate 82 is pivotally mounted to the rearmost edge of topwall 41 by hinge 83. The plate 82 may move from its retracted position as shown, to its extended position, shown in broken lines in FIG. 2.

The means employed to move plate 82 from its retracted to extended positions include a pair of telescoping hydraulic cylinders 88, only one of which is shown in FIG. 2. Each cylinder 88 is pivotally mounted outside tunnel 32 on intake backing plate 51 by means of brackets 91. The exposed end of the piston 89 of each cylinder 88 is pivotally connected to the surface of plate 82 adjoining backwall 40 by brackets 95. In the embodiment illustrated, piston 89 is formed of three telescoping sections. Elongated slots 84 are provided in backwall 40 to permit passage of the cylinder 88 and piston 89.

When fluid under pressure is introduced into hydraulic cylinders 88, pistons 89 will be urged downwardly and rearwardly with respect to loading apparatus 10. This motion will cause tunnel cleanout plate 82 to pivot rearwardly about its mounting on topwall 41. Each piston 89 is mounted near opposite edges of plate 82. This arrangement insures uniform and effective application of force to pivot plate 82 with respect to tunnel 32. Plate 82 is equipped with reinforcing plates 86 at both mounting points for brackets 95. Reinforcing plates 86 extend to the lower edge of plate 82 to strengthen its lower section.

Even after completion of the filling of an agricultural bag 12, the tunnel 32 will contain highly compressed silage. It is common to find up to three tons of silage entrapped in the tunnel. The entrapped silage represents a potential economic loss. If the loading apparatus 10 is moved, there is the danger of this silage being ejected at an undesirable moment.

It is clear that the tunnel cleanout plate 82 provides the solution to this problem. Upon completion of loading of an agricultural bag 12, the operator activates the hydraulic cylinders 88 by forcing pressurized fluid into the cylinders through hydraulic lines 99. Pistons 89 force the tunnel clean out plate 82 to pivot from the retracted position to the extended position, thereby cleaning out substantially all of the silage entrapped within tunnel 32. When plate 82 reaches the extended position, the pressure may be relieved from hydraulic cylinders 88 and the plate 82 return to the retracted position either by hand or by use of hydraulic or mechanical aids.

FIG. 3 illustrates a vertical section view of a portion of the rear of loading apparatus 10 taken along line 3—3 of FIG. 2. It illustrates the positioning of the two hydraulic cylinders 88. FIG. 3 clearly shows that the pistons 89 of each cylinder 88 are attached to plate 82 near opposite edges. This placement insures a more uniform distribution of stresses within plate 82 than would be possible by use of a single piston acting on the center of plate 82. The use of two cylinders 88 also permits each cylinder to be smaller, and therefore more readily employed in the relatively closely spaced structure of loading apparatus 10. Twin cylinders also permit placement of a large hydraulic reservoir 97 on the outside surface of backwall 40 to insure an adequate supply for operation of loading apparatus 10. It can also be seen from FIG. 3 that the plate 82 in the retracted position is situated such that its lower edge is coincident with the top surface of comb 48, thereby preventing any silage from being forced behind the cleanout plate 82 when in its retracted position and decreasing the effective volume of tunnel 32.

Although particular embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

We claim:

1. A tunnel cleanout mechanism for the output chamber tunnel of an agricultural bag loading apparatus for loading material into agricultural bags, the agricultural bag loading apparatus having a compression means within a passageway in communication with the output chamber tunnel for compressing and feeding material into the output chamber tunnel, the output chamber tunnel having a bottom wall, sidewalls, top wall and backwall with an open end for communication with an agricultural bag, said mechanism comprising:

tunnel cleanout plate means mounted to one of the walls of the output chamber tunnel within the output chamber tunnel for movement between retracted and extended positions, said tunnel cleanout plate means abutting at least one wall of the output chamber tunnel in the retracted position to permit free passage of material through the output chamber tunnel between the passageway and open end of the output chamber tunnel; and means operable between said apparatus and said tunnel cleanout plate means for moving said plate means from the retracted position to the extended position, said means acting to cause said plate means to remove substantially all of the material in said tunnel during movement of said plate means from the retracted position to the extended position.

2. The tunnel cleanout mechanism of claim 1 wherein said tunnel cleanout plate means is mounted within said tunnel by pivotally securing one edge of said plate means to said tunnel, said mounting permitting said plate means to pivot from the retracted position within said tunnel to the extended position, the remaining edges of said plate means abutting portions of the inner surface of said tunnel when said plate means is in the retracted position to avoid interference with the loading operation.

3. The tunnel cleanout mechanism of claim 1 wherein said means for moving said plate means comprises a first and a second hydraulic cylinder each having reciprocating pistons, the exposed end of the piston of said first cylinder pivotally mounted to the surface of said plate means adjoining the inner surface of said tunnel near one edge of said plate means and said first cylinder pivotally mounted on said loading apparatus outside of said tunnel, the exposed end of the piston of said second cylinder pivotally mounted to the surface of said plate means adjoining said inner surface of said tunnel near the opposite edge of said plate means and said second cylinder pivotally mounted on said loading apparatus outside of said tunnel, said tunnel being slotted for passage of said first and second cylinders and pistons therethrough.

4. The tunnel cleanout plate means of claim 1 wherein the lower edge of said plate means coincides with the upper edge of the comb of said agricultural bag loading apparatus when said plate means is in the retracted position.

5. The tunnel cleanout plate means of claim 1 wherein said plate abuts the inner surface of the topwall and backwall of said tunnel in the retracted position.

6. In an agricultural bag loading apparatus for loading silage and the like into an agricultural bag including an intake for receiving silage, an output for discharging silage into an agricultural bag, and a silage moving device for forcing silage from the intake through a passageway into the output and into the agricultural bag, said output having the form of a tunnel with an open end for guiding silage into the agricultural bag and for mounting and storing unfilled agricultural bags, said tunnel having a substantially flat bottom wall, two sidewalls, a curved backwall and a substantially flat topwall, the improvement comprising a tunnel cleanout mechanism for removing entrapped silage and the like from said tunnel and comprising:

tunnel cleanout plate means mounted to a wall of said tunnel within the tunnel for movement between retracted and extended positions, said tunnel cleanout plate means abutting at least one wall in the retracted position to permit free passage of silage and the like from the passageway to the open end of said tunnel and guiding the silage and the like into the agricultural bag through the open end of said tunnel; and means operable between said apparatus and said tunnel cleanout plate means for moving said plate means from a retracted position to an extended position, said means acting to cause said plate means to remove substantially all the silage and the like in said tunnel during motion of said plate means from the retracted to extended positions.

7. The improvement of claim 6 wherein said tunnel cleanout plate means is mounted within said tunnel by pivotally securing the top edge of said plate means to the top wall of said tunnel, the remaining edges of said plate means abutting portions of the inner surface of said tunnel when said plate means is in the retracted position to avoid interference with the loading operation.

8. The improvement of claim 6 wherein said means for moving said plate means comprises a first and a second hydraulic cylinder each having reciprocating pistons, the exposed end of the piston of said first cylinder pivotally mounted to the surface of said plate means adjoining said backwall of said tunnel near one edge of said plate means and said first cylinder pivotally mounted on said loading apparatus outside of said tunnel, the exposed end of the piston of said second cylinder pivotally mounted to the surface of said plate means adjoining said backwall of said tunnel near the opposite edge of said plate means said second cylinder pivotally mounted on said loading apparatus outside of said tunnel, said backwall being slotted for passage of said first and second cylinder and piston therethrough.

9. The improvement of claim 6 wherein the lower edge of said plate means coincides with the upper edge of the comb of said agricultural bag loading apparatus when said plate means is in the retracted position.

10. The improvement of claim 6 wherein said plate means abuts the inner surface of the topwall and backwall of said tunnel in the retracted position.

11. An agricultural bag loading apparatus having a tunnel cleanout mechanism comprising:

an intake chamber;

an output chamber tunnel having a bottomwall, sidewalls, a topwall and a backwall;

a passageway connecting said intake chamber and said output chamber tunnel;

a primary shaft rotatably mounted in said intake chamber and having teeth thereon for compressing said material and forcing said material from said intake chamber, through said passageway and into said output chamber tunnel;

means mounted on said loading apparatus for stripping material from said teeth of said primary shaft, the interaction of said means and said primary shaft causing the material in said output chamber tunnel to be compressed and fed into an agricultural bag;

means to rotate said primary shaft;

means attaching the filled end of said agricultural bag to said loading apparatus, said means having a brake mechanism for yieldably permitting separation of the filled end of said agricultural bag and said loading apparatus in response to material being fed into said agricultural bag;

a tunnel cleanout plate pivotally mounted at its top edge to the top wall of said output chamber tunnel, said plate being pivotable from a retracted position in which said plate abuts the inner surface of the topwall and backwall of said tunnel and the lower edge of the plate coincides with the upper edge of said stripping means with all edges of said plate abutting portions of the inner surface of said tunnel to avoid interference with the feeding of material into the agricultural bag, to an extended position, pivotal movement of said plate from the retracted to extended positions causing the lower edge of said plate to define an arcuate path extending toward the filled agricultural bag and downward with respect to the upper edge of said stripping means, the pivotal movement of said plate means from the retracted to extended positions removing substantially all of the material from said tunnel;

hydraulic cylinder means having reciprocating piston means, the exposed end of the piston means pivotally mounted to the surface of said plate adjoining the inner surface of said tunnel said cylinder means pivotally mounted on said loading apparatus outside of said tunnel, said tunnel being slotted for passage of said cylinder means and the piston means therethrough.

* * * * *